(12) United States Patent
Borschert et al.

(10) Patent No.: US 6,988,859 B2
(45) Date of Patent: Jan. 24, 2006

(54) DRILL BIT AND METHOD FOR GRINDING A DRILL BIT

(75) Inventors: Bernhard Borschert, Bamberg (DE); Dieter Mühlfriedel, Ebermannstadt (DE)

(73) Assignee: Kennametal Inc., LaTrobe, PA (US)

( * ) Notice: Subject to any disclaimer, the term of this patent is extended or adjusted under 35 U.S.C. 154(b) by 181 days.

(21) Appl. No.: 10/147,444

(22) Filed: May 16, 2002

(65) Prior Publication Data

US 2003/0002941 A1 Jan. 2, 2003

Related U.S. Application Data

(63) Continuation-in-part of application No. PCT/EP00/11174, filed on Nov. 11, 2000.

(51) Int. Cl.
*B23B 51/02* (2006.01)

(52) U.S. Cl. .......................... 408/230; 451/48
(58) Field of Classification Search ................ 428/277, 428/230, 211, 223, 224; 451/48; 76/108.1, 76/108.6

See application file for complete search history.

(56) References Cited

U.S. PATENT DOCUMENTS

| | | | | |
|---|---|---|---|---|
| 3,564,947 A | * | 2/1971 | Maier | 408/211 |
| 4,116,580 A | * | 9/1978 | Hall et al. | 408/230 |
| 4,222,690 A | | 9/1980 | Hosoi | |
| 4,381,162 A | | 4/1983 | Hosoi | |
| 4,583,888 A | * | 4/1986 | Mori et al. | 408/59 |
| 4,826,368 A | | 5/1989 | Tikal et al. | |
| 5,230,593 A | * | 7/1993 | Imanaga et al. | 408/230 |
| 5,231,802 A | * | 8/1993 | Hosoi | 451/48 |
| 5,273,380 A | | 12/1993 | Musacchia | |
| 5,716,172 A | * | 2/1998 | Nakamura et al. | 408/230 |
| 5,846,035 A | * | 12/1998 | Karafillis et al. | 408/1 R |

FOREIGN PATENT DOCUMENTS

| | | | |
|---|---|---|---|
| CH | 566183 | * | 9/1975 |
| DE | 1502529 | | 4/1970 |
| DE | 1952217 | * | 3/1971 |
| DE | 2154924 | | 5/1973 |
| DE | 2851183 | | 6/1979 |
| DE | 3619245 | | 3/1987 |
| DE | 3726251 | * | 2/1989 |
| EP | 0127322 | | 12/1984 |
| EP | 0333651 | | 9/1989 |
| GB | 2028190 | * | 3/1980 |

OTHER PUBLICATIONS

Dubbel, Taschenbuch für den Maschinenbau 15, korrigierte und ergänzte Aulflage, Herausgegeben von W. Beitz und K.-H. Küttner, Springer–Verlag, Berlin, Heidelberg, N.Y., Tokyo 1983.

* cited by examiner

*Primary Examiner*—Daniel W. Howell
(74) *Attorney, Agent, or Firm*—Nils H. Ljungman & Associates

(57) ABSTRACT

The invention relates to a drill bit (2), having main cutting edges (4a, 4b) which are connected together by a transversal cutting edge (6). An open surface (7) which extends into a flute (8) lies adjacent to each main cutting edge. The drill bit (2) is ground, in particular, during a continuous three-dimensional grinding process in such a way that the open surface (7) forms a continuous curved surface which follows a radius of curvature (R) running from the main cutting edge (4a) in the direction of the flute (8). The continuous grinding process, in comparison to a conventional two-stage process, produces an improved drill bit geometry which is devoid of ridges (16). The ridge-free configuration reduces the mechanical stress during drilling to a minimum.

20 Claims, 10 Drawing Sheets

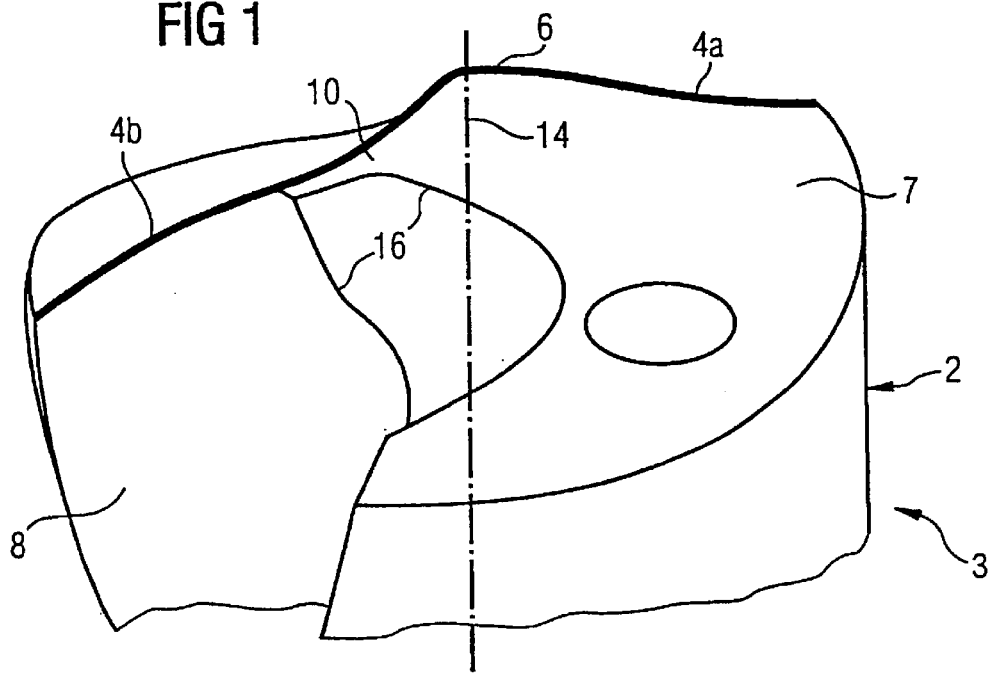

DRILL BIT AND METHOD FOR GRINDING A DRILL BIT

This application is a Continuation-In-Part application of International Patent Application No. PCT/EP00/11174, filed on Nov. 11, 2000, which claims priority from Federal Republic of Germany Patent Application No. 199 55 172.3, filed on Nov. 16, 1999. International Patent Application No. PCT/EP00/11174 was pending as of the filing date of this application. The United States was an elected state in International Patent Application No. PCT/EP00/11174.

BACKGROUND OF THE INVENTION

1. Field of the Invention

The invention relates to a drill bit and a method for grinding a drill bit having two major cutting edges connected via a chisel edge, adjacent to each of which major cutting edges is a clearance face that transitions into a flute.

2. Background Information

Such drill bits are used for, among other things, twist drills in which the chips removed by the drill bit are removed via flutes in the drill that run in a spiral pattern. For this purpose, the drill bit and drill are designed in one or two pieces. In the two-piece design, the drill bit is realized in particular in the form of a replaceable insert for a drill base element.

The geometric configuration, and especially the grinding of the drill bit, determines to a significant extent the cutting action of the drill and the mechanical load on the drill, especially on the drill bit. The mechanical load during drilling is also determined by, among other things, the configuration of the area around the chisel edge. To reduce the load, the chisel edge is therefore generally pointed during grinding. With pointing, the rake angle is determined in the area of the drill core, which defines the angle between the surface adjoining the chisel edge and the longitudinal axis of the drill. This surface is referred to below as the chisel edge surface. The rake angle in the area of the chisel edge facing away from the major cutting edge is determined, in particular, by where the clearance face associated with the cutting edge transitions into the flute. A positive rake angle is often desired in this area. A positive rake angle means that the chisel edge surface is tilted toward the longitudinal axis of the drill, so that a type of overhang is formed. On the other hand, with a negative rake angle, this surface is tilted away from the axis of the drill.

In conventional grinding methods with pointing, the major cutting edges and the chisel edge, as well as the clearance faces adjoining the major cutting edges, are ground in a first process step. The pointing is then carried out in a second working step. For this purpose, it is essential that the grinding wheel used for the grinding be reset. Consequently a ridge, i.e., a discontinuity, is ground into both the clearance face and the chisel edge surface. The ridge in the chisel edge surface is necessarily formed because, under all circumstances, the grinding wheel must be prevented from reaching the chisel edge already ground during pointing. In the area of the chisel edge, this ridge causes stress peaks that lead to increased loading on the drill bit.

More recent development trends have attempted to produce drill bits without grinding via a metal injection molding process.

OBJECT OF THE INVENTION

The object of this invention is to configure a drill bit so that the mechanical loads that occur during drilling are kept low.

SUMMARY OF THE INVENTION

The invention teaches that this object can be accomplished by a method for grinding a drill bit having two major cutting edges joined via a chisel edge, adjacent to each of which is a clearance face that transitions into a flute, whereby the clearance face is realized in the form of a curved surface without ridges from the major cutting edge toward the flute with a radius of curvature R.

A drill tip of this type has the significant advantage that, on account of the curved, ridge-free surface with the radius of curvature R, therefore because the surface has a profile without shoulders, the load on the drill tip during drilling is low. In particular, no stress peaks occur in the area of the chisel edge surfaces of the type that occur on conventionally ground drill tips.

Additional preferred embodiments of the drill bit are described in the features of the invention included herein below.

The drill bit is preferably a ground drill bit. Alternatively, the geometry described above can also be achieved with a metal injection molding process.

In one particularly advantageous embodiment, the drill bit is realized in the form of a replaceable insert for a drill base element. This type of two-part drill, consisting of a drill bit and drill base element, has the major advantage that the drill bit, which is subject to wear, can be easily replaced. The drill base element is generally exposed to much less wear, so that its useful life is several times longer than the useful life of the drill bit. By realizing the drill bit in the form of a replaceable insert, operating costs can therefore be reduced significantly. Moreover, the drill base element can be realized from a more economical and thus generally softer material than the material of which the drill bit is made.

The invention further teaches a method for grinding a drill bit that has, among other things, two major cutting edges connected to each other via a chisel edge, adjacent to each of which major cutting edges is a clearance face that transitions into a flute, whereby a grinding wheel used for the grinding and the drill tip are guided toward each other in a continuous grinding process so that the clearance face is realized in the form of a surface that curves from the major cutting edge toward the flute with a radius of curvature.

The grinding wheel and drill bit are thereby guided toward each other in a complex three-dimensional grinding process, so that the drill bit is ground in the desired manner without the requirement for two separate grinding processes. On account of the continuous grinding process, no ridges are formed in the area of the clearance face and chisel edge surface of the type that would be unavoidably formed in a two stage grinding process. Therefore, as a result of the three-dimensional guidance of the drill tip and the grinding wheel, the two conventional grinding steps are therefore combined into one grinding step. The advantages of this method are reflected in, among other things, the curvature of the clearance face. On account of the shoulder-less and ridge-less profile of the ground surfaces of the drill tip, the load on the drill tip during drilling is also kept low.

One other possible advantage of the above-described drill tip design is that the power needed to rotate the drill during a cutting or drilling operation in some materials can be reduced by as much as approximately 30% over drill tips of the prior art, such as shown in FIG. 1 of this application. Therefore the energy requirement for operation of a drive or motor mechanism to rotate the drill during drilling is reduced.

For the lowest possible load on the drill tip, the method is preferably carried out so that the radius of curvature is between 0.05 and 0.5 times the diameter of the drill.

To form the curved surface, the grinding wheel comprises a main grinding surface that is pivoted relative to the drill bit by a pivot angle. This pivoting movement can be executed either by the drill bit, or by the grinding surface, or by both together. The angle referred to as the pivot angle is reduced during this pivoting movement between the surface normals of the main grinding surface and the longitudinal axis of the drill bit.

To form an appropriate drill bit geometry, the drill bit is preferably first rotated around its longitudinal axis up to an angle of rotation, and only then does pivoting by the pivot angle occur. Consequently, the clearance face directly adjacent to the major cutting edge, which is called the main clearance face, initially runs obliquely and is then increasingly curved toward the flute.

For the most uniform possible realization of the curved surface, as it pivots by the pivot angle α, the drill bit is simultaneously rotated further to a predetermined final angle of rotation.

In a particularly advantageous variant, a secondary grinding surface of the grinding wheel and drill bit are pivoted for its pointing in the area of the chisel edge relative to each other by a rake angle. This secondary grinding surface abuts the main grinding surface of the grinding wheel, and the chisel edge surface, i.e., the transition from the chisel edge to the clearance face, is ground with it. The profile of this surface relative to the longitudinal axis of the drill bit then gives the rake angle (the rake angle of the chisel edge). To realize the rake angle, the entire grinding wheel is pivoted relative to the longitudinal axis of the drill bit.

The pivoting movements by the pivot angle and by the rake angle are preferably superimposed on each other. The grinding wheel is therefore pivoted by two angles simultaneously. The pivoting movement by the pivot angle then occurs around a pivot axis that runs roughly radially outward from the chisel edge, and the pivot movement by the rake angle occurs around a pivot axis that runs roughly tangential to the chisel edge. As a result of the superimposition of these two pivoting movements, it is guaranteed that, on the one hand, a suitable pointing is achieved and, on the other hand, the ground surfaces transition into each other smoothly and uniformly. In particular, the chisel edge surface makes a smooth transition into the clearance face, i.e. it has no shoulders or ridges.

The rake angle is preferably set between a positive rake angle of +5° and a negative rake angle of −5°. The advantage of the method described above is particularly apparent in the realization of a positive rake angle, which can be achieved easily and without problems using the method described above.

To realize an appropriate drill bit geometry, the pivot angle is between 30° and 60°, and is in particular approximately 50°. The angle of rotation is preferably between 60% and 90%, and is in particular approximately 80% of the final angle of rotation. This final angle of rotation is typically in a range between 90° and 140°.

To correctly grind the chisel edge, in one preferred variant the grinding wheel protrudes above the drill center at the beginning of the grinding process, so that the grinding wheel assumes an above-center grinding position. The drill bit and grinding wheel are then guided into a below-center grinding position, in which the grinding wheel ends before the drill center. The grinding of the clearance face, as well as pointing, can then be done in the below-center grinding position.

The advantages and the particular embodiments above with respect to the method can be transferred and applied as appropriate to the drill tip.

The above-discussed embodiments of the present invention will be described further hereinbelow. When the word "invention" is used in this specification, the word "invention" includes "inventions", that is the plural of "invention". By stating "invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

The invention is explained in greater detail below with reference to the exemplary embodiment illustrated in the accompanying schematic drawings, in which:

FIG. 1 depicts a drill bit ground according to a method of the prior art;

FIG. 2 depicts a drill bit ground according to a method taught by an embodiment of the invention;

DESCRIPTION OF THE PREFERRED EMBODIMENT

Figure 3:
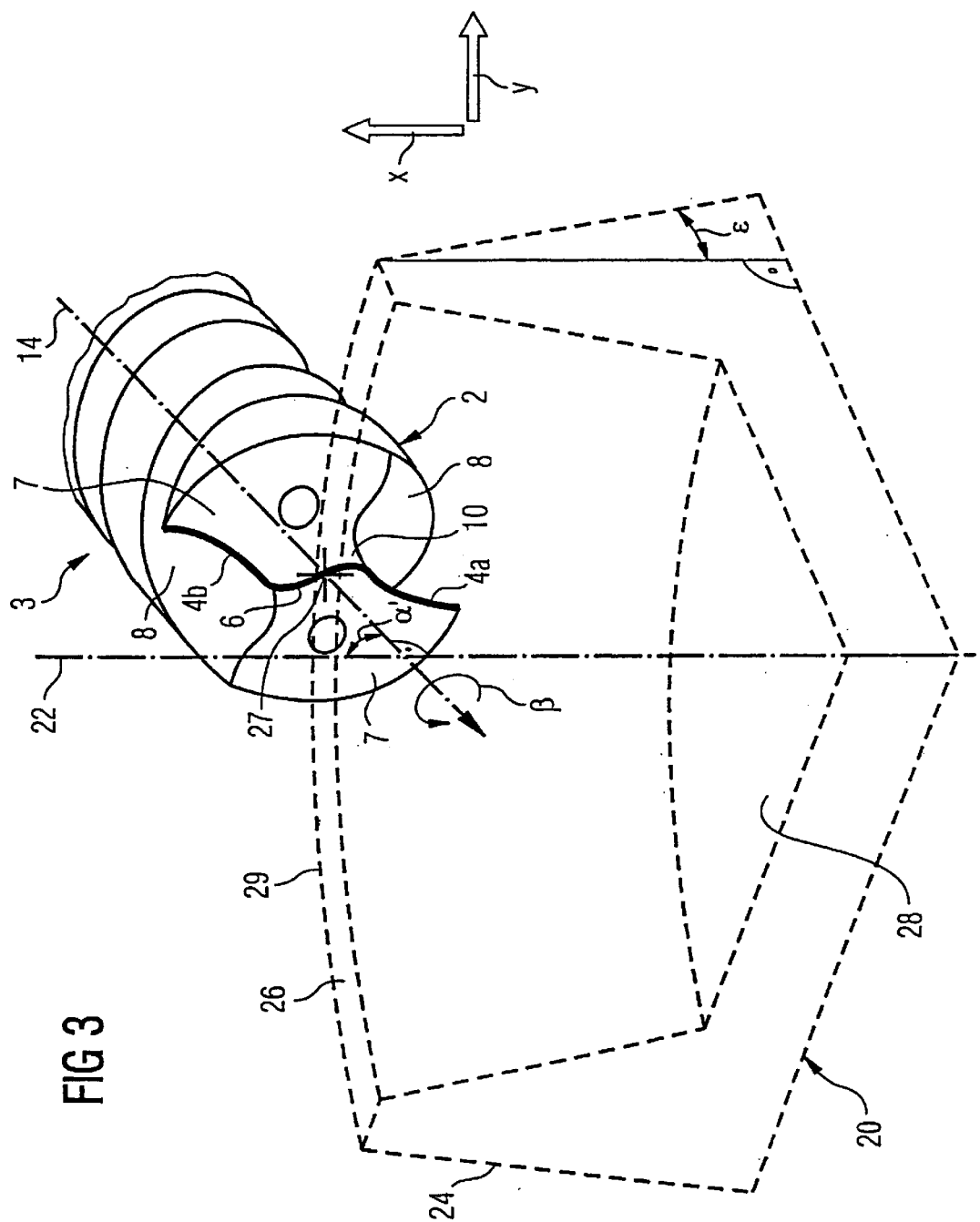
FIG. 3 depicts a drill and grinding wheel in an initial position at the beginning of the grinding process, in a perspective view.

Equivalent parts in the figures are identified by the same reference numbers.

A drill bit 2 of a twist drill 3 that has been ground according to a method of the prior art (FIG. 1) and one that has been ground according to a method taught by an embodiment of the invention (FIG. 2) are contrasted in FIGS. 1 and 2. The drill bit 2 has two major cutting edges 4a, 4b, which are joined together via a roughly S-shaped chisel edge 6. The major cutting edges 4a, 4b and the chisel edge 6 are depicted in wider lines for purposes of illustration. The cutting edges formed by the major cutting edges 4a, 4b and chisel edge 6 extend over the entire drill bit 2. The drill bit 2 is designed to have mirror symmetry. The drill bit 2 is explained below with reference to one of the two mirror-image sides, starting from the major cutting edge 4a. Adjacent to it is a clearance face 7 that extends to a flute 8. The flute 8 begins in the drill bit 2 and runs in a spiral pattern in the flute area 9 of the drill 3 adjacent to the drill bit 2. The clearance face 7 adjacent to the major cutting edge 4 is designed essentially in the form of a conical surface. A surface referred to as the chisel edge surface 10 also extends from the chisel edge 6 to the flute 8. The chisel edge surface 10 and clearance face 7 transition into each other. The chisel edge surface 10 is ground, in particular, during the pointing of the drill bit 2. In this case, the angular relationship between this surface 10 and the longitudinal axis 14 of drill bit 2 is set. The corresponding angle is referred to as rake angle δ (cf. especially FIG. 7).

During a grinding process of the prior art, the grinding wheel is reset in a second process step for pointing and is brought close to the chisel edge surface 10, especially in the area in which the chisel edge 6 transitions into the second major cutting edge 4b. To prevent contact between the grinding wheel and the chisel edge 6 and the main cutting edge 4b that has already been ground, a certain safety spacing must be maintained relative to these two cutting edges (4b, 6). In the ground drill bit 2, this separation is apparent in the fact that the chisel edge surface 10 has a sharp bend or ridge 16. It extends into clearance face 7. The clearance face is therefore bent at ridge 16 toward flute 8. Undesirably high mechanical loads during drilling are exerted on this ridge 16, especially in the area of the chisel edge surface 10.

On account of the continuous three-dimensional grinding process according to the new grinding method, this ridge 16 is avoided in the drill bit 2 as shown in FIG. 2. Instead, the chisel edge surface 10 makes a smooth transition into the clearance face 7, and both extend to flute 8 without any sharp bends or ridges. It is also characteristic of the drill bit 2 that is ground according to the new method, in addition to the ridge-free profile, that the clearance face 7 is curved from the major cutting edge 4a to the flute 8 and has a radius of curvature R. This radius of curvature R is preferably between 0.05 and 0.5 times the drill diameter D. To illustrate the individual grinding areas, the clearance face 7 is divided into two differently shaded partial areas 7A and 7B, partial area 7A essentially representing the curved portion of the clearance face 7. The chisel edge surface 10 is also shown shaded as the third grinding area. All three grinding areas (10, 7A, 7B) are ground in a continuous grinding process and make smooth transitions into one another. The outer line 18 of the clearance face 7 running on the periphery of drill bit 2 forms with it in the area of the transition to flute 8 (projected on the longitudinal axis 14) a pivot angle α, which is preferably between 30° and 60° (for definition of pivot angle α, also see FIGS. 6 and 7).

The grinding method taught by an embodiment of the invention is also explained in greater detail below with reference to FIGS. 3 to 5, in which the relative position between a grinding wheel 20 and the drill bit 2 is shown in a perspective view and in different grinding positions. The relative movement between drill bit 2 and grinding wheel 20 is decisive for the three-dimensional grinding process described below. For the sake of simplicity, the grinding process is expressed either by movement of the drill bit 2 or by movement of the grinding wheel 20. It goes without saying that the corresponding movement can also be reasonably carried out by the other part. For greater clarity, only sections of the grinding wheel 20 are shown and are shaded in FIGS. 3 to 5.

According to the initial position depicted in FIG. 3, the longitudinal axis 14 of drill bit 2 is aligned at an angle α' to a center axis 22 of grinding wheel 20, which is 90° at the beginning of grinding. The grinding wheel 20 has a ridge with a trapezoidal geometry, viewed in cross section, in which the one outside of the trapezoid is realized in the form of a main grinding surface 24 and the end surface adjacent to this side surface is realized in the form of a secondary grinding surface 26. The main grinding surface 24 transitions into the secondary grinding surface 26 to form a curve. This curve essentially defines a rounded transition between chisel edge surface 10 and the clearance face 7. The radial dimension of the main grinding wheel 26 is greater than the drill radius, so that it fully covers the clearance face 7. This ring-shaped grinding element sits with its trapezoidal base surface on a disk-like support 28 and forms the grinding wheel 20 with it. The grinding wheel 20 is tightened by means of support 28 so that it rotates as necessary.

The longitudinal axis 14 is drawn through the tip of drill bit 2, i.e., the drill center 27. It can be seen in FIG. 3 that the main grinding surface 24 protrudes above the drill center 27 in the area of the chisel edge 6. The grinding wheel 20 is therefore set above-center at the beginning of the grinding process. During the grinding process, the drill 3 is then guided along an x-axis into a below-center position. The above-center initial position is used to grind the chisel edge 6, which is held approximately perpendicular to the peripheral line 29 of the secondary grinding surface 26 at the beginning of the grinding process. The major cutting edge 4a is ground at the beginning of the grinding process. The drill is then rotated around the longitudinal axis 14 by an angle of rotation β, so that the clearance face 7 adjacent to the major cutting edge 4a is ground. The major cutting edge 4a, as well as the clearance face 7, slope outward from the drill center 27. The major cutting edge 4a and a radial component of the clearance face 7 are therefore sloped at an angle ε to an imaginary cross sectional plane 34 of drill bit 2 (cf. also FIG. 6). In the vertical alignment of the longitudinal axis 14 to the center axis 22 this angle ε is determined by the trapezoidal angle ε between the main grinding surface 24 and the line perpendicular to the base surface of the trapezoid.

In addition to the rotational movement around the angle of rotation β and the initial displacement along the x-axis, the drill bit is advanced in the direction of the longitudinal axis 14 toward the grinding wheel 20, so that the clearance face 7, and indeed its tangential component, runs at an angle λ obliquely to the imaginary cross sectional plane 34 of drill 3. The outside line 18 therefore curves obliquely in the direction toward flute 8, starting from major cutting edge 4a (cf. FIG. 6).

Figure 4:
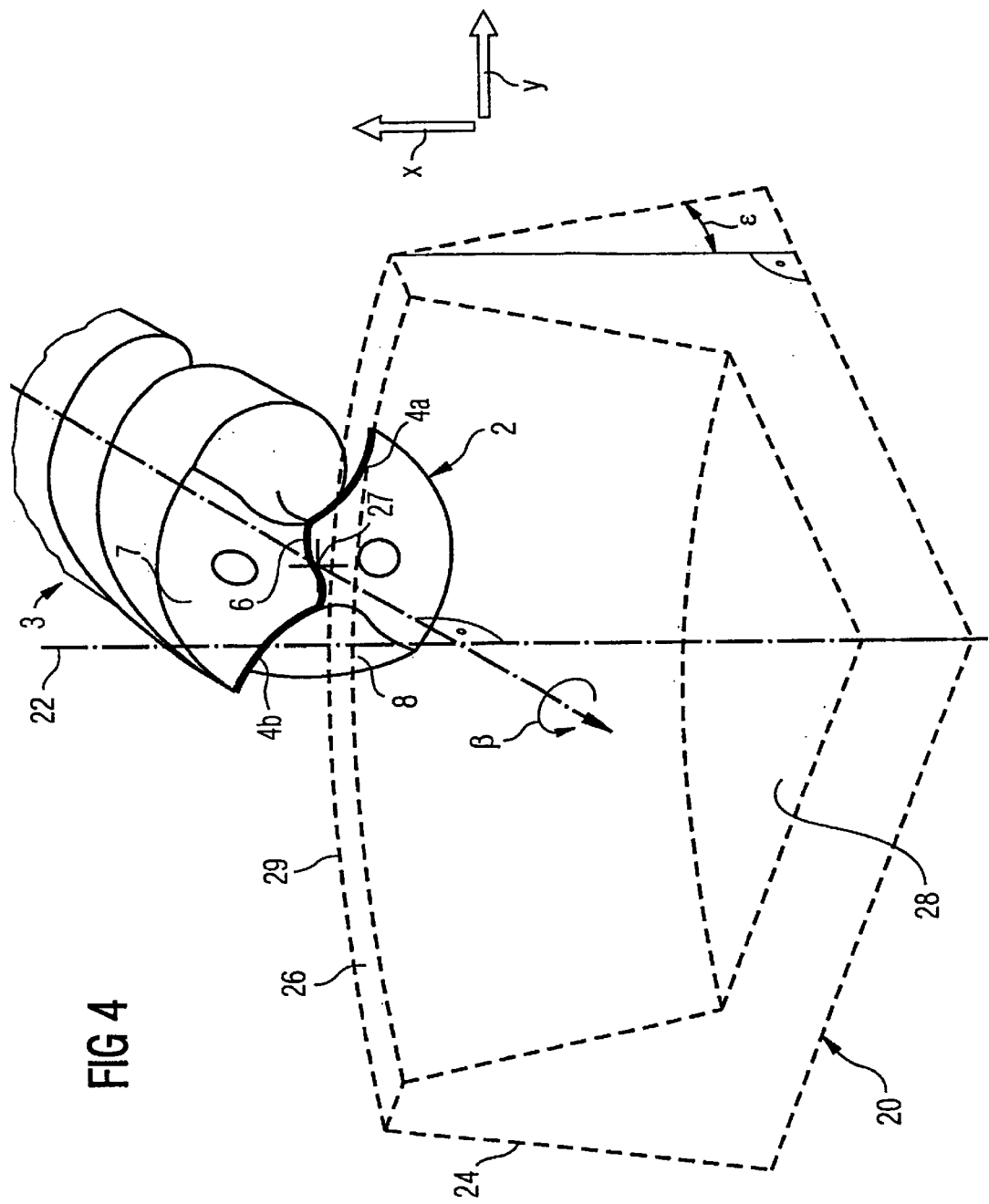
FIG. 4 depicts the drill and grinding wheel in a center position during the grinding process, also in a perspective view.
Figure 5:
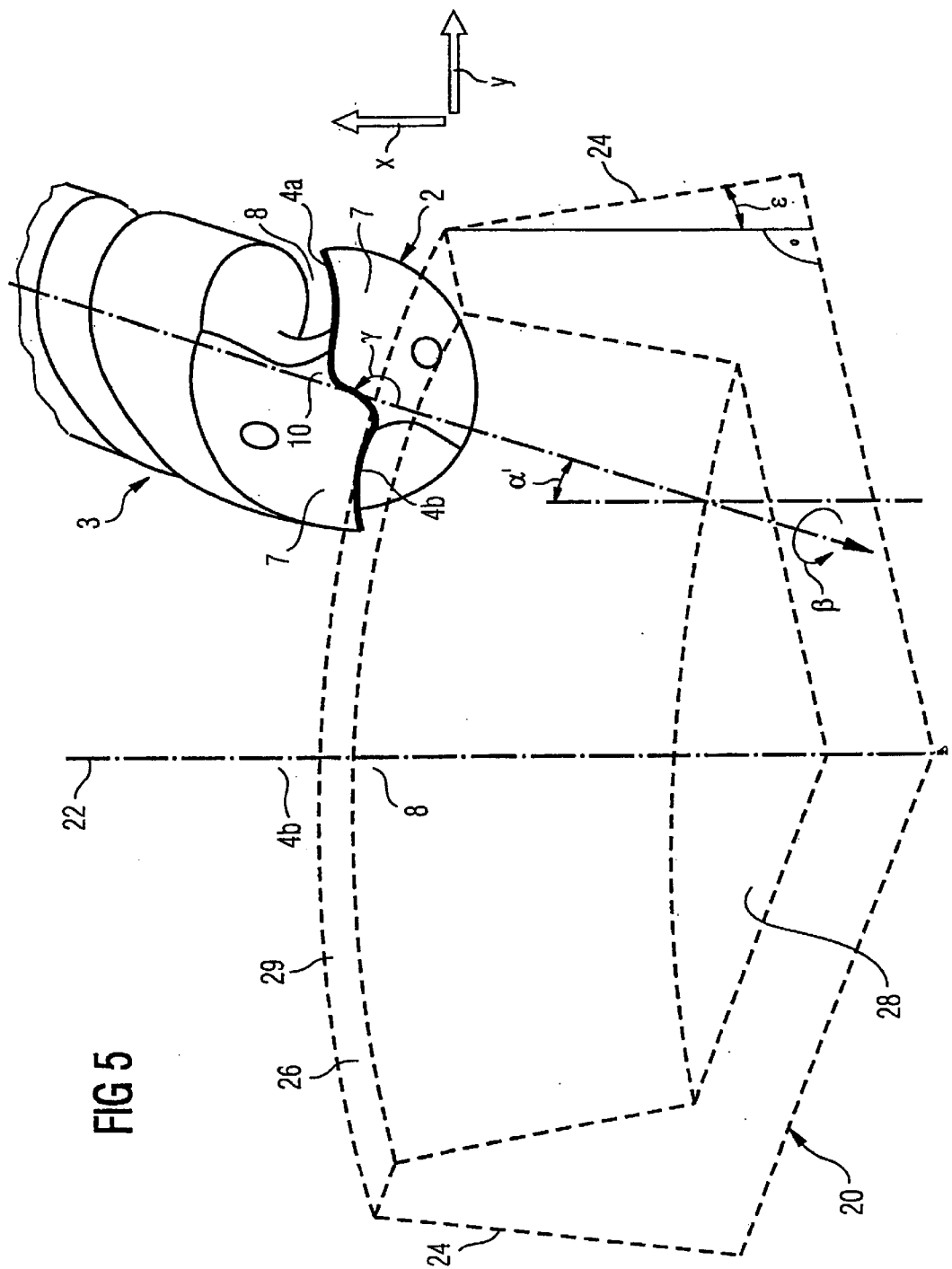
FIG. 5 depicts the drill and grinding wheel in an end position after the grinding process, also in a perspective view.

In the center position as shown in FIG. 4, the drill bit 2 is situated relative to the grinding wheel 20 in a below-center grinding position, i.e., the chisel edge 6 lies next to the secondary grinding surface 26. Its peripheral line 29 now runs roughly tangentially to the chisel edge 6. The grinding process up to the depicted center position essentially corresponds to a conventional grinding process of the prior art. The new process is characterized by the fact that, starting from the center position, the drill bit 2 is pivoted relative to main grinding surface 24 on the one hand, and relative to secondary grinding surface 26 on the other hand. Pivoting relative to main grinding surface 24 occurs by pivot angle α around a main axis 30, and pivoting relative to secondary grinding surface 26 occurs by rake angle δ around a secondary axis 32, as can be gathered from FIGS. 6 and 7. By pivoting by pivot angle α, the angle α' between the longitudinal axis 14 and center axis 22 connected to pivot angle α is reduced. This can be gathered from FIG. 5, from which it is apparent that the drill 3 is now aligned at all acute angle α' relative to center axis 22, after having been originally aligned perpendicular to center axis 22 at the beginning of the grinding process.

Figure 6:
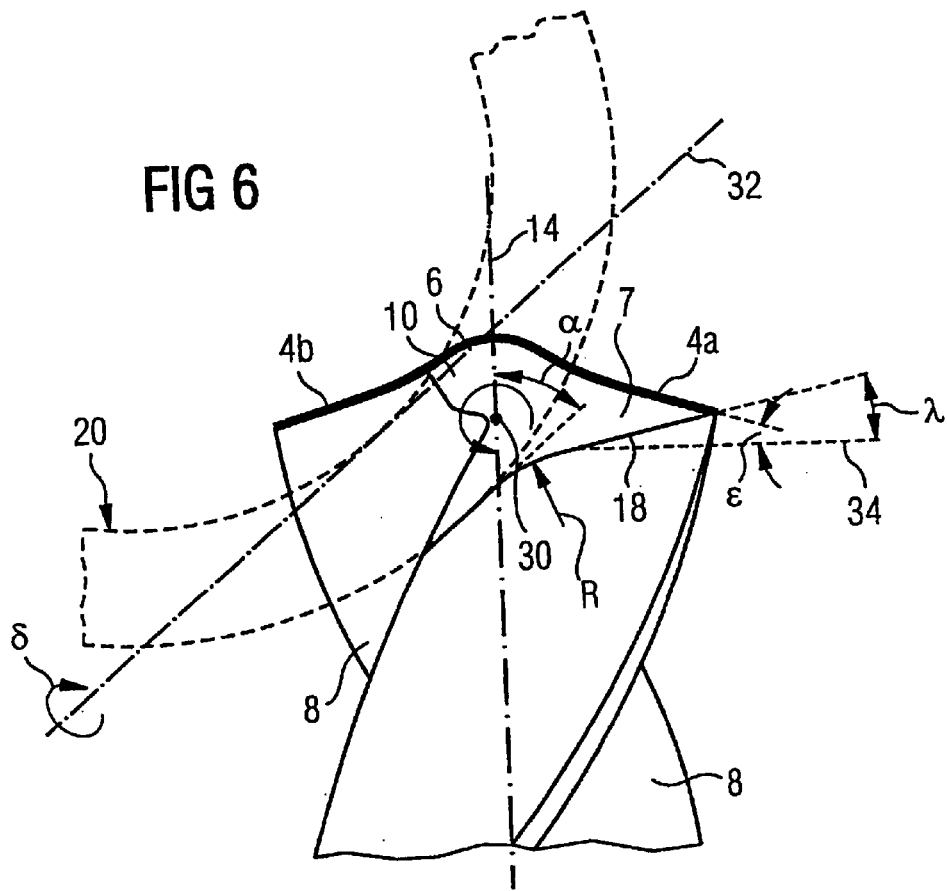
FIG. 6 is a side view of the drill and grinding wheel.
Figure 7:
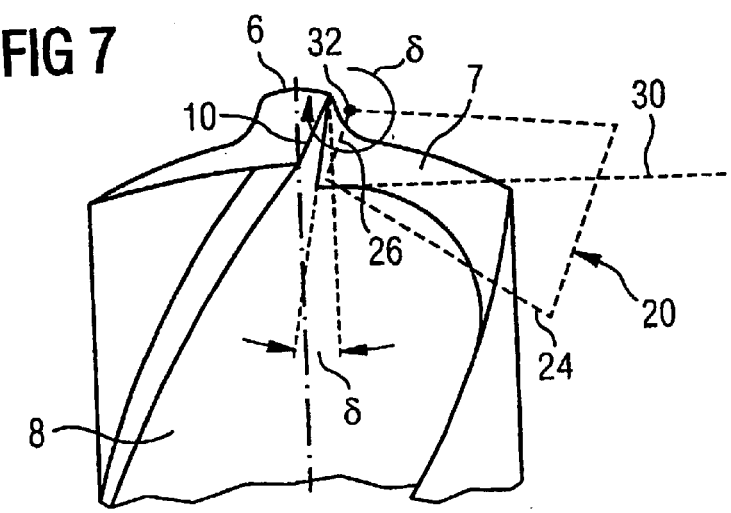
FIG. 7 is a side view of the drill and grinding wheel rotated by 90° in comparison with FIG. 6.

FIGS. 6 and 7 illustrate more clearly the pivoting movement that is carried out between the drill 3 and the grinding wheel 20 in the transition from the center position to the end position. The grinding wheel 20 is shown in a schematic side view, again only in sections and by a broken line for the sake of clarity. FIG. 6 shows a side view, in which the direction of viewing is essentially perpendicular to the chisel edge 6, and FIG. 7 shows a side view in which the direction of viewing is approximately in the longitudinal direction of the chisel edge 6.

It can be gathered from FIG. 6 that the major cutting edge 4a runs at angle e to an imaginary cross sectional plane 34 of drill bit 2. It can also be gathered that the peripheral line 18 of clearance face 7 runs initially obliquely at angle λ in the direction toward flute 8, beginning from the major cutting edge 4a, and then has a curvature with a radius of curvature R. To form this curve, the grinding wheel 20 is pivoted with its main grinding surface 24 around the main axis 30 by pivot angle α. This angle is defined as the angle between the longitudinal axis 14 and the tangential component of the main grinding surface 24.

The grinding wheel 20 is preferably pivoted simultaneously around secondary axis 32 by the rake angle δ to form a rake angle in the area of chisel edge 6. A positive rake angle δ of up to +5° is preferably set for chisel edge surface 10. The chisel edge surface 10 is ground by means of the secondary grinding surface 26, so that it forms a type of overhang, as can be gathered from FIG. 7. The rake angle δ establishes the angle between the secondary grinding surface 26 and the longitudinal axis 14. Because of the fixed angular relationship between the two grinding surfaces 24, 26, the rake angle δ is determined by the alignment of the radial component of the main cutting surface 24 to the longitudinal axis 14.

To summarize, the preferred grinding process can be broken down into the following steps:

1. Beginning of the grinding process in an above-center grinding position at an angle of rotation β, in which the longitudinal axis 14 is aligned perpendicular to the center axis 22 (starting position, FIG. 3).

2. Movement of the drill 3 into a below-center grinding position along the x-axis. At the same time, there is an advance in the direction of the longitudinal axis 14, as well as a rotational movement around this axis up to an angle of rotation β of approximately 80% of the final rotation angle γ. There can simultaneously be a translation movement of the drill along a y-axis which runs perpendicular to the x-axis. The x-axis and the center axis 22 are parallel. (Center position, FIG. 4). Three movement components are therefore superimposed in the transition from the initial position to the center position.

3. Further rotation of the drill 3 to an end angle γ, so that the drill 3 executes a roughly 120° rotation, beginning from the starting position. At the same time, there is a further advance in the direction of the longitudinal axis 14, as well as movement along the x-axis, and pivoting by pivot angle α, as well as by rake angle δ. A total of five movement components are therefore superimposed in the final working step until the end position is reached.

Pivoting by the rake angle δ as described in No. 3 above is optional here. The formation of a rake angle δ is determined by the application for which the drill 3 is intended. The method makes it possible to easily and very flexibly adjust the rake angle δ easily and very flexibly. The decisive advantage of the method is seen in the fact that the grinding process is conducted in a continuous method, and a second setting of the grinding wheel with the necessary ridge-like transitions in the area of clearance face 7 and chisel edge surface 10 connected with this can be eliminated.

Figure 8:
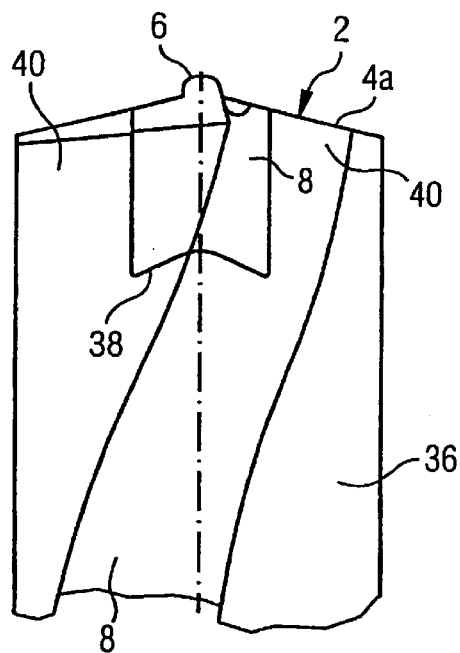
FIG. 8 depicts a drill with replaceable drill bit.

The drill 3 is preferably designed in two parts as shown in FIG. 8 and, for this purpose, has a drill base element 36, having a recess 38 on its end, into which the correspondingly designed drill bit 2 can be inserted, and specifically so that it can be replaced as necessary. The drill bit 2 is secured in drill base element 36, for example, by a clamping force exerted by two arms 40. As an alternative, or in addition, the drill bit 2 can be fixed in the base element 36 by a locking device (not shown). The flute 8 running in the drill base element 36 extends into the drill bit 2. This configuration, with a replaceable drill bit 2, makes it possible to keep the operating costs for the drilling tools low, because the component that is exposed to the highest mechanical loads is realized in the form of a replaceable part.

Figure 8A:
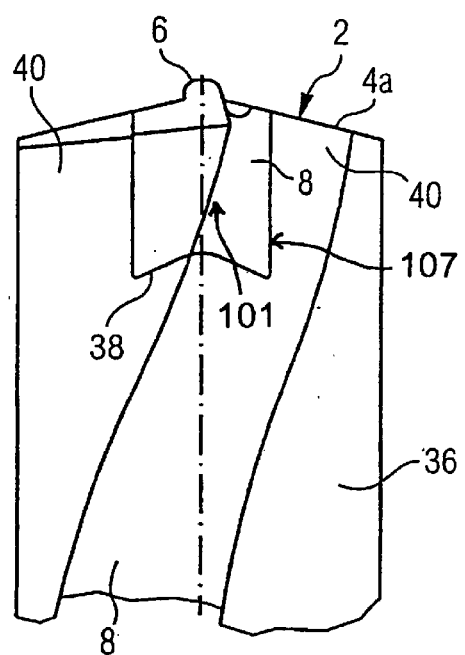
FIG. 8A shows the drill with the replaceable drill bit as shown in FIG. 8, with additional references.

FIG. 8A shows the drill with the insert as shown in FIG. 8, with additional references. Specifically, the edges 101 and 107 of the flute portion of the drill bit insert are indicated.

Figure 9:
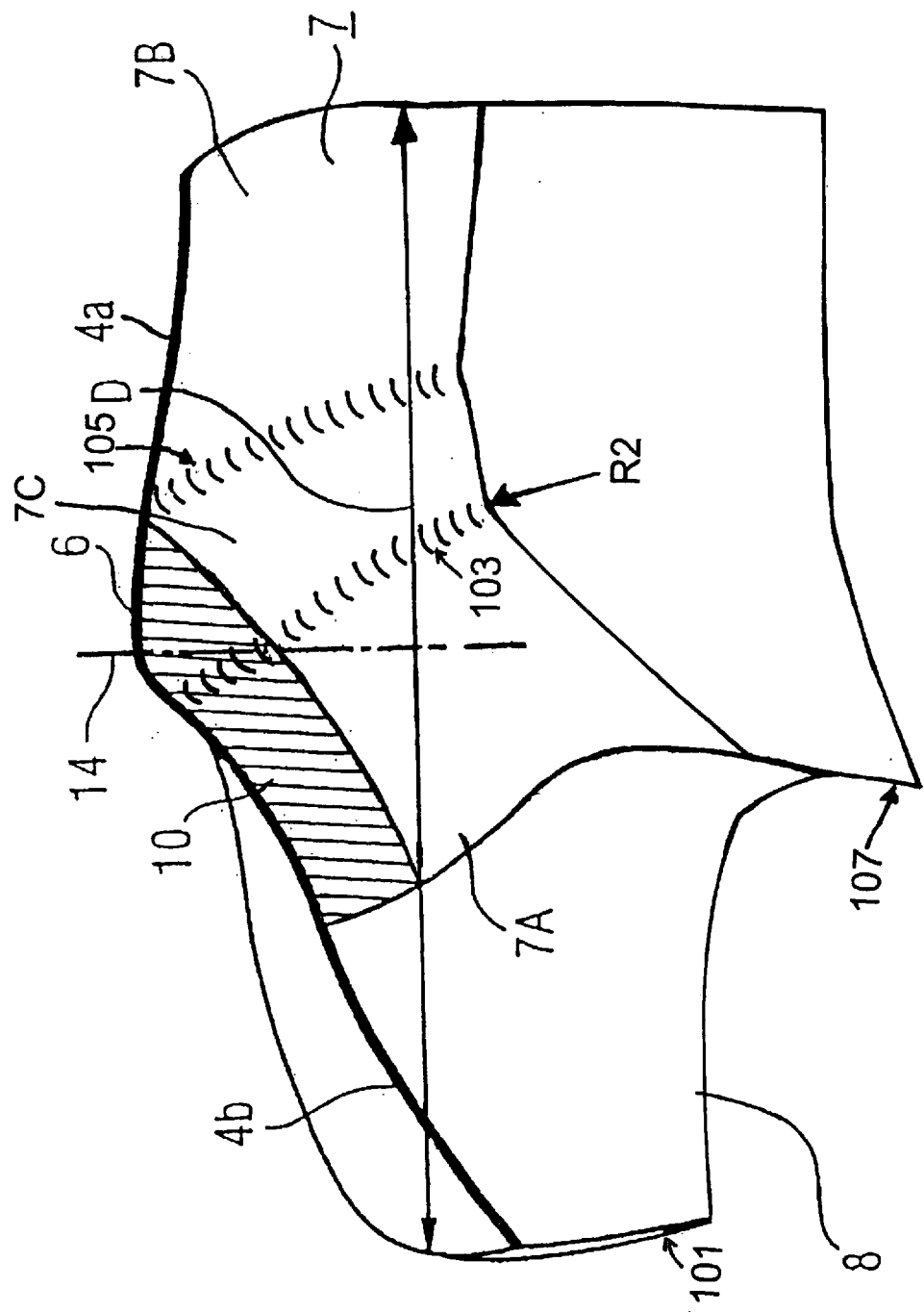
FIG. 9 shows a view of one possible embodiment of a drill insert according to at least one possible embodiment of the present invention, which view is similar to that shown in FIG. 2 with additional features.

FIG. 9 shows a view of one possible embodiment of a drill insert according to at least one possible embodiment of the present invention. The drill insert has similar features as the drill tip shown in FIG. 2. FIG. 9 shows an additional partial area of FIG. 7, designated as area 7C. Areas 7A and 7C are both relatively flat surfaces. A rounded transition section 103 between areas 7A and 7C is illustrated. The rounded section 103 extends up to the chisel edge 6. Another rounded transition section 105 between areas 7B and 7C is also illustrated. This rounded section 105 also extends up to the chisel edge. In the embodiment shown in FIG. 9, area 7B has a slightly curved surface that curves upward to the major cutting edge 4A. The radius of curvature R2 is substantially smaller than the radius of curvature R1 shown in FIG. 2. FIG. 9 also shows the flute edges 101 and 107 shown in FIG. 8A.

Figure 10:
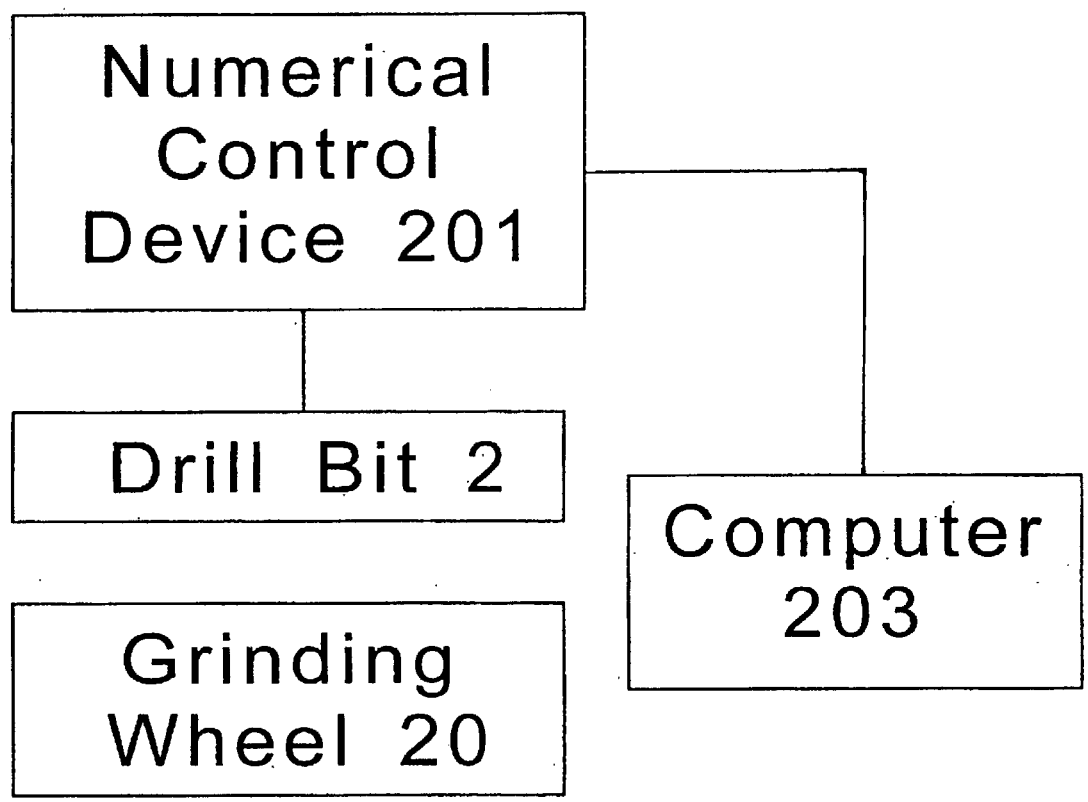
FIG. 10 shows a box diagram of at least one possible embodiment of the present invention.

FIG. 10 shows a box diagram of at least one possible embodiment of the present invention. The drill bit 2 and the grinding wheel 20 are represented. In this particular embodiment, the drill bit 2 is mounted in or connected to a numerical control device 201 which controls the three-dimensional movement of the drill bit 2 during the grinding process. The numerical control device 201 moves the drill bit 2 into and out of engagement with the grinding wheel 20 in order to grind the different surfaces and curves, such as areas 7A and 7B and curve 103, to achieve the desired shape of the drill bit 2. A computer 203 is utilized to program and control the numerical control device 201 to execute a particular series of movements to properly grind the drill bit 2. The grinding wheel 20 is mounted in a stationary manner in this particular embodiment.

Figure 11:
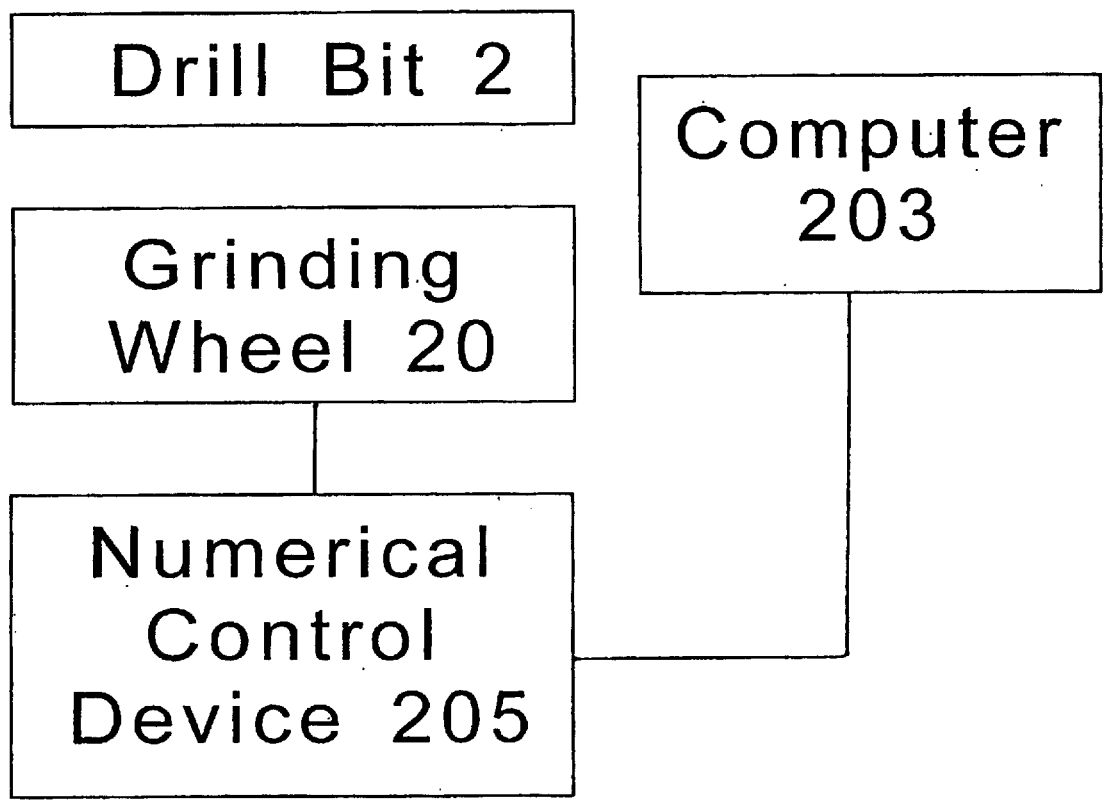
FIG. 11 shows another box diagram of at least one possible embodiment of the present invention, similar to that shown in FIG. 10.

FIG. 11 shows another box diagram of at least one possible embodiment of the present invention, similar to that shown in FIG. 10. However, in this embodiment, the grinding wheel 20 is mounted in or connected to a numerical control device 205 which controls the three-dimensional movement of the grinding wheel 20 during the grinding process. The numerical control device 205 moves the grinding wheel into and out of engagement with the drill bit 2 in order to grind the different surfaces and curves, such as areas 7A and 7B and curve 103, to achieve the desired shape of the drill bit 2. The computer 203 is utilized to program and control the numerical control device 205 to execute a particular series of movements to properly grind the drill bit 2. The drill bit 2 is mounted in a stationary manner in this particular embodiment.

Figure 12:
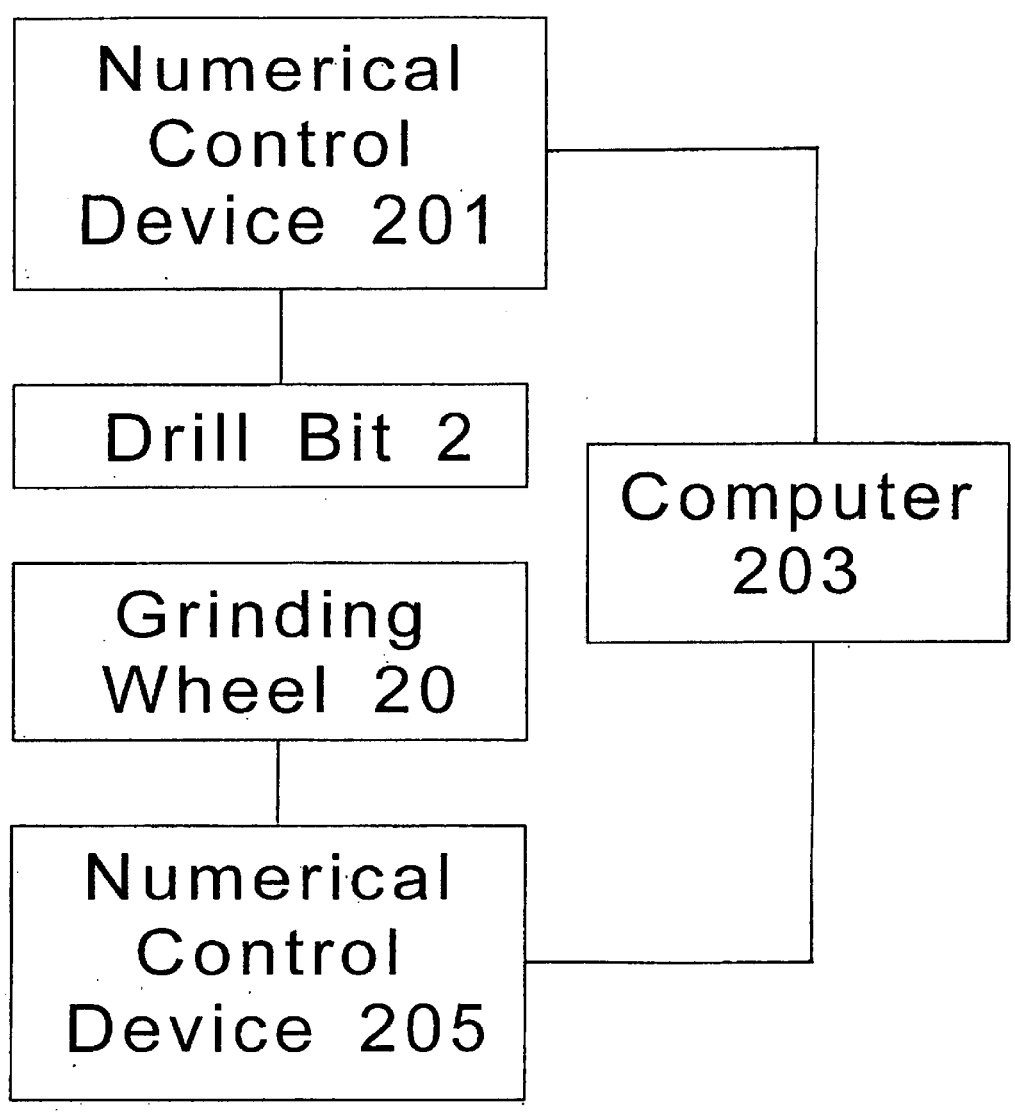
FIG. 12 shows yet another box diagram of at least one possible embodiment of the present invention, which embodiment combines the features shown in FIGS. 10 and 11.

FIG. 12 shows yet another box diagram of at least one possible embodiment of the present invention, which embodiment combines the features shown in FIGS. 10 and 11. In this embodiment, both the drill bit 2 and the grinding wheel 20 are each mounted in or connected to their respective numerical control devices 201, 205, which control the three-dimensional movement of the drill bit and the grinding wheel 20 during the grinding process. The numerical control devices 201, 205 move the drill bit and the grinding wheel into and out of engagement with each other in order to grind the different surfaces and curves, such as areas 7A and 7B and curve 103, to achieve the desired shape of the drill bit 2. The computer 203 is utilized to program and control the numerical control devices 201, 205 to execute a particular series of movements to properly grind the drill bit 2.

One feature of the invention resides broadly in a drill bit 2, having two major cutting edges 4a, 4b joined together via a chisel edge 6, adjacent to each of which is a clearance face 7 that transitions into a flute 8, characterized by the fact that the clearance face 7 is realized in the form of a surface with a radius of curvature R that is curved without ridges from the major cutting edge 4a, 4b toward the flute 8.

Another feature of the invention resides broadly in a drill bit 2, characterized by the fact that the radius of curvature R is between 0.05 and 0.5 times the drill diameter D.

Yet another feature of the invention resides broadly in a drill bit 2, characterized by the fact that the clearance face 7 forms a pivot angle $\alpha$ at the transition to flute 8 with longitudinal axis 14 that is between approximately 30° and 60°, and is in particular approximately 50°.

Still another feature of the invention resides broadly in drill bit 2 characterized by the fact that a pointing having a rake angle $\delta$ that is between +5° and -5°, is made in the vicinity of the chisel edge 6.

A further feature of the invention resides broadly in the drill bit 2, characterized by the fact that it is realized in the form of a replaceable insert for a drill base element 36.

Another feature of the invention resides broadly in a method for grinding of a drill bit 2 that has two major cutting edges 4a, 4b connected via a chisel ridge 6, adjacent to each of which is a clearance face 7 that transitions into a flute 8, characterized by the fact that a grinding wheel 20 and the drill bit 2 are brought together in a continuous grinding process, that the clearance face 7 is realized in the form of a surface that has a radius of curvature R curved from the major cutting edge 4a, 4b in the direction toward flute 8.

Yet another feature of the invention resides broadly in a method for grinding of a drill bit 2, characterized by the fact that the radius of curvature R is between 0.05 and 0.5 times the drill diameter D.

Still another feature of the invention resides broadly in a method for grinding of a drill bit 2, characterized by the fact that a main grinding surface 24 of grinding wheel 20 and the drill bit 2 are pivoted to form the curved surface relative to each other around a pivot angle $\alpha$.

A further feature of the invention resides broadly in a method for grinding of a drill bit 2, characterized by the fact that the drill bit 2 is initially rotated around its longitudinal axis 14 to an angle of rotation $\beta$, and pivoting around pivot angle $\alpha$ then occurs.

Another feature of the invention resides broadly in a method for grinding of a drill bit 2, characterized by the fact that during the pivoting of drill bit 2 around its longitudinal axis 14, it is further rotated up to a final angle of rotation $\gamma$.

Yet another feature of the invention resides broadly in a method for grinding of a drill bit 2, characterized by the fact that a secondary grinding surface 26 of the grinding wheel 20 and the drill bit 2 are pivoted relative to each other around a rake angle $\delta$ for pointing of the drill bit 2 in the area of the chisel edge 6.

Another feature of the invention resides broadly in a method for grinding of a drill bit 2, characterized by the fact that the pivoting movements by the pivot angle $\alpha$ and by the rake angle $\delta$ are superimposed.

Yet another feature of the invention resides broadly in a method for grinding of a drill bit 2, characterized by the fact that the rake angle $\delta$ is between +5° and -5°.

Still another feature of the invention resides broadly in a method for grinding of a drill bit 2, characterized by the fact that the pivot angle $\alpha$ is between 30° and 60°, and in particular is approximately 50°.

A further feature of the invention resides broadly in a method for grinding of a drill bit 2, characterized by the fact that the angle of rotation $\beta$ is between 60% and 90%, and in particular approximately 80% of the final angle of rotation $\gamma$.

Another feature of the invention resides broadly in a method for grinding of a drill bit 2, characterized by the fact that at the beginning of the grinding process, the grinding wheel 20 protrudes above the drill center 27, so that an above-center grinding position is present, and that the drill bit 2 and grinding wheel 20 are then guided into a below-center grinding position, in which the grinding wheel ends in front of the drill center.

The components disclosed in the various publications, disclosed or incorporated by reference herein, may be used in the embodiments of the present invention, as well as equivalents thereof.

The appended drawings in their entirety, including all dimensions, proportions and/or shapes in at least one embodiment of the invention, are accurate and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

All of the patents, patent applications or patent publications, which were cited in the German Office Action dated Aug. 29, 2000, and the International Search Report dated Mar. 22, 2001, and/or cited elsewhere are hereby incorporated by reference as if set forth in their entirety herein as follows: DE 21 54 924 B2; DE-AS 15 02 529; DE 28 51 183 C2; U.S. Pat. No. 5,273,380; EP 0 333 651; and EP 0 127 322.

The corresponding foreign and international patent publication applications, namely, Federal Republic of Germany Patent Application No. 199 55 172.3, filed on Nov. 16, 1999, having inventors Bernhard BORSCHERT and Dieter MUEHLFRIEDEL, and DE-OS 199 55 172.3 and DE-PS 199 55 172.3, and International Application No. PCT/EP00/11174, filed on Nov. 11, 2000, having WIPO Publication No. WO01/36134 and inventors Bernhard BORSCHERT and Dieter MUEHLFRIEDEL, as well as their published equivalents, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

The details in the patents, patent applications and publications may be considered to be incorporable, at applicant's option, into the claims during prosecution as further limitations in the claims to patentably distinguish any amended claims from any applied prior art.

Some examples of drills and/or drill bits that may possibly be utilized or adapted for use in at least one possible embodiment of the present invention may be found in the following U.S. Pat. No. 6,220,117 B1, issued to Butcher on Apr. 24, 2001; U.S. Pat. No. 5,740,872, issued to Smith on Apr. 21, 1998; U.S. Pat. No. 5,725,313, issued to Singh et al. on Mar. 10, 1998; U.S. Pat. No. 5,421,425, issued to Griffin on Jun. 6, 1995; U.S. Pat. No. 4,506,432, issued to Smith on Mar. 26, 1985; U.S. Pat. No. 4,169,637, issued to Voitas on Oct. 2, 1979; U.S. Pat. No. 4,087,137, issued to Voitas on May 2, 1978; U.S. Pat. No. 6,220,117 B1, issued to Butcher on Apr. 24, 2001; U.S. Pat. No. 4,971,485, issued to Nomura et al. on Nov. 20, 1990; U.S. Pat. No. 6,135,218, issued to Deane et al. on Oct. 24, 2000; U.S. Pat. No. 6,029,544, issued to Katayama on Feb. 29, 2000; U.S. Pat. No. 5,979,571, issued to Scott et al. on Nov. 9, 1999; U.S. Pat. No. 5,836,409, issued to Vail, III on Nov. 17, 1998; U.S. Pat. No. 4,241,483, issued to Voitas on Dec. 30, 1980; U.S. Pat. No. 4,200,159, issued to Peschel et al. on Apr. 29, 1980; U.S. Pat. No. 4,169,637, issued to Voitas on Oct. 2, 1979; U.S. Pat. No. 5,882,152, issued to Janitzki on Mar. 16, 1999; U.S. Pat. No. 4,211,294, issued to Multakh on Jul. 8, 1980; U.S. Pat. No. 6,241,036 B1, issued to Lovato et al. on Jun. 5, 2001; U.S. Pat. No. 5,743,346, issued to Flood et al. on Apr. 28, 1998; U.S. Pat. No. 5,154,550, issued to Isobe et al. on Oct. 13, 1992; and U.S. Pat. No. 4,720,371, issued to Shirley on Jan. 19, 1988.

Some examples of milling cutters that may possibly be utilized or adapted for use in at least one possible embodiment of the present invention may be found in the following U.S. Pat. No. 6,231,281 B1, issued to Nishikawa on May 15, 2001; U.S. Pat. No. 6,220,795 B1, issued to Matthews on Apr. 24, 2001; U.S. Pat. No. 6,217,262 B1, issued to Wright on Apr. 17, 2001; U.S. Pat. No. 6,176,648 B1, issued to Mizutani on Jan. 23, 2001; U.S. Pat. No. 6,158,927, issued to Cole et al. on Dec. 12, 2000; U.S. Pat. No. 6,146,059, issued to Rohr on Nov. 14, 2000; U.S. Pat. No. 6,109,838, issued to Rivière on Aug. 29, 2000; U.S. Pat. No. 6,042,308, issued to Schmitt on Mar. 28, 2000; U.S. Pat. No. 5,967,706, issued to Hughes, Jr. on Oct. 19, 1999; U.S. Pat. No. 5,957,628, issued to Bentjens et al. on Sep. 28, 1999; U.S. Pat. No. 5,934,842, issued to Gupta on Aug. 10, 1999; U.S. Pat. No. 5,919,008, issued to Shimomura on Jul. 6, 1999; U.S. Pat. No. 5,899,642, issued to Berglōw et al. on May 4, 1999; U.S. Pat. No. 5,868,529, issued to Rothballer et al. on Feb. 9, 1999; U.S. Pat. No. 5,848,858, issued to Jager et al. on Dec. 15, 1998; U.S. Pat. No. 5,820,308, issued to Hoefler on Oct. 13, 1998; U.S. Pat. No. 5,762,452, issued to Mina on Jun. 9, 1998; U.S. Pat. No. 5,672,031, issued to Oles on Sep. 30, 1997; U.S. Pat. No. 5,542,795, issued to Mitchell on Aug. 6, 1996; U.S. Pat. No. 5,542,794, issued to Smith et al. on Aug. 6, 1996; U.S. Pat. No. 5,529,439, issued to Werner et al. on Jun. 25, 1996; U.S. Pat. No. 4,990,035, issued to Scheuch et al. on Feb. 5, 1991; U.S. Pat. No. 4,938,638, issued to Hessman et al. on Jul. 3, 1990; U.S. Pat. No. 4,930,949, issued to Giessler on Jun. 5, 1990; U.S. Pat. No. 4,848,978, issued to Keritsis on Jul. 18, 1989; U.S. Pat. No. 4,799,838, issued to Kubo et al. on Jan. 24, 1989; U.S. Pat. No. 4,789,273, issued to Wiacek et al. on Dec. 6, 1988; U.S. Pat. No. 4,729,697, issued to Lacey on Mar. 8, 1988; U.S. Pat. No. 4,728,228, issued to Okunishi et al. on Mar. 1, 1988; U.S. Pat. No. 4,627,771, issued to Kieninger on Dec. 9, 1986; U.S. Pat. No. 4,623,284, issued to Greiff on Nov. 18, 1986; U.S. Pat. No. 4,533,282, issued to Lindlar et al. on Aug. 6, 1985; U.S. Pat. No. 4,519,731, issued to Jester et al. on May 28, 1985; U.S. Pat. No. 4,493,594, issued to Okada on Jan. 15, 1985; U.S. Pat. No. 4,461,602, issued to Zettl on Jul. 24, 1984; U.S. Pat. No. 4,359,299, issued to Sagarian on Nov. 16, 1982; U.S. Pat. No. 4,204,787, issued to McCray et al. on May 27, 1980; U.S. Pat. No. 4,097,174, issued to Heinlein on Jun. 27, 1978; U.S. Pat. No. 4,093,392, issued to Hopkins on Jun. 6, 1978; U.S. Pat. No. 4,061,076, issued to Robertson on Dec. 6, 1977; U.S. Pat. No. 4,050,129, issued to Jester et al. on Sep. 27, 1977; and U.S. Pat. No. 4,050,128, issued to Lange on Sep. 27, 1977.

Some examples of grinding devices or grinding methods for use in grinding drills which may possibly be used in at least one possible embodiment of the present invention may possibly be found in the following U.S. Pat. No. 6,071,047 entitled "Method and apparatus for feeding coolant liquid and separating and recovering it in cutting machine and grinding machine"; U.S. Pat. No. 5,735,732 entitled "Precision drill sharpener and grinding wheel assembly therefor"; U.S. Pat. No. 5,649,853 entitled "Drill bit grinding machine"; U.S. Pat. No. 5,311,703 entitled "Multiple purpose tool grinding device"; U.S. Pat. No. 5,263,286 entitled "Drill and drill grinding method and apparatus"; U.S. Pat. No. 5,231,802 entitled "Drill and drill grinding method and apparatus"; U.S. Pat. No. 5,210,977 entitled "Drill grinding device"; U.S. Pat. No. 5,181,811 entitled "Drill and drill grinding method and apparatus"; U.S. Pat. No. 5,179,809 entitled "Drill grinding machine"; U.S. Pat. No. 5,125,186 entitled "Drill grinding machine"; U.S. Pat. No. 5,090,159 entitled "Multi-purpose grinder"; U.S. Pat. No. 4,858,389 entitled "Apparatus for grinding twist drills"; U.S. Pat. No. 4,680,896 entitled "Tool unloading mechanism for automatic tool grinding machine"; U.S. Pat. No. 4,642,942 entitled "Method and apparatus for grinding the tip of a twist drill"; U.S. Pat. No. 4,608,643 entitled "Automatic tool grinding machine with computerized control"; U.S. Pat. No. 4,590,711 entitled "Semi-automatic grinding machine"; U.S. Pat. No. 4,574,529 entitled "Apparatus for grinding twist drills"; U.S. Pat. No. 4,574,528 entitled "Apparatus for grinding twist drills"; U.S. Pat. No. 4,468,891 entitled "Machine for point grinding drills"; U.S. Pat. No. 4,365,444 entitled "Drill point grinding machine"; U.S. Pat. No. 4,148,161 entitled "Loading unit for an automatic bur grinding machine"; U.S. Pat. No. 4,142,332 entitled "Drill grinding fixture"; U.S. Pat. No. 4,106,242 entitled "Workhead for an automatic bur grinding machine"; U.S. Pat. No. 4,078,457 entitled "Method of grinding concave raking surfaces of blade of circular saw"; U.S. Pat. No. 4,052,821 entitled "Automatic bur grinding machine"; U.S. Pat. No. 4,023,552 entitled "Method of dressing the grinding wheel in a sharpener for twist drills"; U.S. Pat. No. 4,016,680 entitled "Sharpener for twist drills including grinding wheel dressing means"; and U.S. Pat. No. 3,952,616 entitled "Adjustable grinding apparatus".

Some examples of numerical control systems or devices which may possibly be used or adapted for use in at least one possible embodiment of the present invention may possibly be found in the following U.S. Pat. No. 6,384,560 entitled "Abnormality detection apparatus for tool and numerical control apparatus provided with same"; U.S. Pat. No. 6,344,724 entitled "Numerical control apparatus for NC machine tool"; U.S. Pat. No. 6,256,546 entitled "System and method for numerical control processing of an in-processing part"; U.S. Pat. No. 6,232,736 entitled "Numerical control machine tool positioning system"; U.S. Pat. No. 6,107,768 entitled "Numerical control apparatus for a machine tool"; U.S. Pat. No. 6,101,444 entitled "Numerical control unit for wellbore drilling"; U.S. Pat. No. 6,036,347 entitled "Numerical control information generator for controlling machine tool processes which require tool exchanges"; U.S. Pat. No. 5,944,079 entitled "Numerical control router enclosed by a housing"; U.S. Pat. No. 5,815,400 entitled "Machining method using numerical control apparatus"; U.S. Pat. No. 5,608,641 entitled "Method and apparatus for simplifying the task of retrieving and accessing a segment of a numerical control (NC) program"; U.S. Pat. No. 5,603,149 entitled "Table replacement apparatus in a numerical control router"; U.S. Pat. No. 5,532,932 entitled "Numerical control unit"; U.S. Pat. No. 5,493,502 entitled "Numerical control unit for controlling a machine tool to machine a workpiece at an instructed feed rate along linear and rotational axes"; U.S. Pat. No. 5,493,193 entitled "Numerical control apparatus and numerical control method"; U.S. Pat. No. 5,486,746 entitled "Positioning rule stopper apparatus in a numerical control router"; U.S. Pat. No. 5,465,215 entitled "Numerical control method and apparatus"; U.S. Pat. No. 5,323,821 entitled "Suction table apparatus of a numerical control router"; U.S. Pat. No. 5,310,397 entitled "Computerized numerical control automatic complex lathe"; U.S. Pat. No. 5,270,915 entitled "Apparatus for generating numerical control information based on shaped data for each machining step"; U.S. Pat. No. 5,255,201 entitled "Numerical control information generating apparatus"; U.S. Pat. No. 5,255,200 entitled "Numerical control information generating system"; U.S. Pat. No. 5,245,544 entitled "Method for determining inner diameter machining method in numerical control information generating function"; U.S. Pat. No. 4,978,901 entitled "Machining data forming system for numerical control device"; U.S. Pat. No. 4,972,322 entitled "Method for preparing numerical control data for a machine tool"; U.S. Pat. No. 4,914,364 entitled "Numerical control apparatus"; U.S. Pat. No. 4,902,950 entitled "Numerical control method with response delay compensating function"; U.S. Pat. No. 4,862,380 entitled "Numerical control unit"; U.S. Pat. No. 4,831,906 entitled "Numerical control machine"; U.S. Pat. No. 4,794,311 entitled "Numerical control system"; U.S. Pat. No. 4,788,481 entitled "Numerical control apparatus"; U.S. Pat. No. 4,751,652 entitled "Numerical control drilling restart control system"; U.S. Pat. No. 4,719,579 entitled "Numerical control method"; U.S. Pat. No. 4,706,373 entitled "Numerical-control machining center for structural sections"; U.S. Pat. No. 4,667,294 entitled "Numerical control apparatus"; U.S. Pat. No. 4,636,938 entitled "Method and apparatus for producing numerical control programs"; U.S. Pat. No. 4,624,607 entitled "Computed numerical control drilling machine"; U.S. Pat. No. 4,617,635 entitled "Numerical control machining system"; U.S. Pat. No. 4,606,001 entitled "Customized canned cycles for computer numerical control system"; U.S. Pat. No. 4,604,705 entitled "Numerical control machining method and system therefor"; U.S. Pat. No. 4,591,771 entitled "Numerical control system"; U.S. Pat. No. 4,588,339 entitled "Tool holder for a cutting machine provided with numerical control"; U.S. Pat. No. 4,549,270 entitled "Method of controlling selection of tools in a quadriaxial numerical control lathe"; U.S. Pat. No. 4,547,854 entitled "Method of controlling lineup of tools in numerical control machine tool"; U.S. Pat. No. 4,484,286 entitled "Numerical control system"; U.S. Pat. No. 4,255,991 entitled "Method and apparatus for electromechanically retrofitting a conventional automatic screw machine to accept numerical control"; U.S. Pat. No. 4,199,814 entitled "Computer numerical control machine tool"; and U.S. Pat. No. 4,149,235 entitled "Computer numerical control system for machine tool".

The invention as described hereinabove in the context of the preferred embodiments is not to be taken as limited to all of the provided details thereof, since modifications and variations thereof may be made without departing from the spirit and scope of the invention.

| AT LEAST PARTIAL LIST OF REFERENCE NUMBERS | |
|---|---|
| 2 | Drill bit |
| 4a, 4b | Major cutting edges |
| 6 | Chisel edge |
| 7 | Clearance face |
| 8 | Flute |
| 10 | Surface |
| 9 | Flute area |
| 14 | Longitudinal axis |
| 16 | Edge |
| 18 | Outside line |
| 20 | Grinding wheel |
| 22 | Center axis |
| 24 | Main grinding surface |
| 26 | Secondary grinding surface |
| 27 | Drill center |
| 28 | Support |
| 29 | Peripheral line |
| 30 | Main axis |
| 32 | Secondary axis |
| 34 | Cross sectional plane |
| 36 | Base element |
| 38 | Recess |

What is claimed is:

1. Drill bit (2), having two major cutting edges (4a, 4b) joined together via a chisel edge (6), adjacent to each of which is a clearance face (7) that transitions into a flute (8), characterized by the fact that the clearance face (7) is realized in the form of a surface with a radius of curvature (R) that is curved without ridges from the major cutting edge (4a, 4b) toward the flute (8).

2. Drill bit (2) as claimed in claim 1, characterized by the fact that the radius of curvature (R) is between 0.05 and 0.5 times the drill diameter (D).

3. Drill bit (2), as claimed in claim 2 characterized by the fact that the clearance face (7) forms a pivot angle (α) at the transition to flute (8) with longitudinal axis (14) that is between approximately 30° and 60°.

4. Drill bit (2) as claimed in claim 3 characterized by the fact that a pointing having a rake angle (δ) that is between +5° and −5°, is made in the vicinity of the chisel edge (6).

5. Drill bit (2) as claimed in claim 4, characterized by the fact that it is realized in the form of a replaceable insert for a drill base element (36), and the pivot angle ($\alpha$) formed by the clearance face at the transition to flute (8) with longitudinal axis (14) is approximately 50°.

6. Method for grinding of a drill bit (2) that has two major cutting edges (4a, 4b) connected via a chisel ridge (6), adjacent to each of which is a clearance face (7) that transitions into a flute (8), characterized by the fact that a grinding wheel (20) and the drill bit (2) are brought together in a continuous grinding process, the grinding wheel being moved to form a clearance face (7) in the form of a surface that has a radius of curvature (R) curved from the major cutting edge (4a, 4b) in the direction toward flute (8).

7. Method as claimed in claim 6, characterized by the fact that the radius of curvature (R) is between 0.05 and 0.5 times the drill diameter (D).

8. Method as claimed in claim 7, characterized by the fact that a main grinding surface (24) of grinding wheel (20) and the drill bit (2) are pivoted to form the curved surface relative to each other around a pivot angle ($\alpha$).

9. Method as claimed in claim 8, characterized by the fact that the drill bit (2) is initially rotated around its longitudinal axis (14) to an angle of rotation ($\beta$), and pivoting around pivot angle ($\alpha$) then occurs.

10. Method as claimed in claim 9, characterized by the fact that during the pivoting of drill bit (2) around its longitudinal axis (14), it is further rotated up to a final angle of rotation (g).

11. Method as claimed in claim 10, characterized by the fact that a secondary grinding surface (26) of the grinding wheel (20) and the drill bit (2) are pivoted relative to each other around a rake angle ($\delta$) for pointing of the drill bit (2) in the area of the chisel edge (6).

12. Method as claimed in claim 11, characterized by the fact that the pivoting movements by the pivot angle ($\alpha$) and by the rake angle ($\delta$) are superimposed.

13. Method as claimed in claim 12, characterized by the fact that the rake angle ($\delta$) is between +5° and −5°.

14. Method as claimed in claim 13, characterized by the fact that the pivot angle ($\alpha$) is between 30° and 60°.

15. Method as claimed in claim 14, characterized by the fact that the angle of rotation ($\beta$) is between 60% and 90% of the final angle of rotation (g).

16. Method as claimed in claim 15, characterized by the fact that at the beginning of the grinding process, the grinding wheel (20) protrudes above the drill center (27), so that an above-center grinding position is present, and that the drill bit (2) and grinding wheel (20) are then guided into a below-center grinding position, in which the grinding wheel ends in front of the drill center, and the pivot angle ($\alpha$) is approximately 50°, and the angle of rotation ($\beta$) is approximately 80% of the final angle of rotation (g).

17. Drill bit (2), as claimed in claim 1 characterized by the fact that the clearance face (7) forms a pivot angle ($\alpha$) at the transition to flute (8) with longitudinal axis (14) that is between approximately 30° and 60°.

18. Drill bit (2) as claimed in claim 1 characterized by the fact that a pointing having a rake angle ($\delta$) that is between +5° and −5°, is made in the vicinity of the chisel edge (6).

19. Drill bit (2) as claimed in claim 1, characterized by the fact that it is realized in the form of a replaceable insert for a drill base element (36).

20. Drill bit (2) as claimed in claim 2 characterized by the fact that a pointing having a rake angle ($\delta$) that is between +5° and −5°, is made in the vicinity of the chisel edge (6), and the clearance face (7) forms a pivot angle ($\alpha$) at the transition to flute (8) with longitudinal axis (14) that is approximately 50°.

* * * * *